United States Patent
Pekas et al.

(10) Patent No.: US 12,153,988 B2
(45) Date of Patent: Nov. 26, 2024

(54) QUANTUM TUNNELING DEVICES FOR GENERATION OF HARMONICS IN PASSIVE WIRELESS TAGS AND SENSORS

(71) Applicant: NATIONAL RESEARCH COUNCIL OF CANADA, Ottawa (CA)

(72) Inventors: Nikola Pekas, Edmonton (CA); Adam Johan Bergren, Edmonton (CA)

(73) Assignee: National Research Council of Canada, Ottawa (CA)

( * ) Notice: Subject to any disclaimer, the term of this patent is extended or adjusted under 35 U.S.C. 154(b) by 72 days.

(21) Appl. No.: 17/786,839

(22) PCT Filed: Dec. 18, 2020

(86) PCT No.: PCT/CA2020/051769
§ 371 (c)(1),
(2) Date: Jun. 17, 2022

(87) PCT Pub. No.: WO2021/119846
PCT Pub. Date: Jun. 24, 2021

(65) Prior Publication Data
US 2023/0035139 A1 Feb. 2, 2023

Related U.S. Application Data

(60) Provisional application No. 62/949,656, filed on Dec. 18, 2019.

(51) Int. Cl.
*G06K 7/10* (2006.01)
*G06K 19/077* (2006.01)

(52) U.S. Cl.
CPC ... *G06K 7/10366* (2013.01); *G06K 19/07773* (2013.01)

(58) Field of Classification Search
CPC .............. G06K 7/10366; G06K 19/07773
See application file for complete search history.

(56) References Cited

U.S. PATENT DOCUMENTS 7,145,453 B2   12/2006   Miller, Jr. et al.
9,047,523 B2    6/2015   Tuttle
(Continued)

FOREIGN PATENT DOCUMENTS

EP   2362960 B1      9/2011
WO   1999/033017 A1  7/1999
WO   2011/103066 A2  8/2011

OTHER PUBLICATIONS

Rasilainen, Kimmo & Viikari, Ville V., "Transponder Designs for Harmonic Radar Applications", International Journal of Antennas and Propagation, vol. 2015, Article ID 565734, 9 pages, 2015. https://doi.org/10.1155/2015/565734.
(Continued)

*Primary Examiner* — Jamara A Franklin
(74) *Attorney, Agent, or Firm* — Aird & McBurney LP

(57) ABSTRACT

A tag detection system comprising a source for producing an interrogation signal having a first frequency; a harmonic radar tag comprising: an antenna structure; a tunneling junction electrically and integrally coupled to the antenna; and wherein the harmonic radar tag when stimulated by the interrogation signal having the first frequency, and the harmonic radar tag produces a response signal at a second frequency different from the first frequency.

13 Claims, 22 Drawing Sheets

(56) References Cited

U.S. PATENT DOCUMENTS

| | | |
|---|---|---|
| 2004/0189473 A1 | 9/2004 | Mickle et al. |
| 2020/0284898 A1 | 9/2020 | Nanzer et al. |
| 2021/0020012 A1* | 1/2021 | Shakedd ................ H02J 7/345 |

OTHER PUBLICATIONS

Rasilainen, Kimmo, et al., "On Design and Evaluation of Harmonic Transponders", IEEE Transactions on Antennas and Propagation, vol. 63, No. 1, pp. 15-23, Jan. 2015, doi: 10.1109/TAP.2014.2366193.

International Search Report issued in International Application No. PCT/CA2020/051769, Mar. 18, 2021, 3 pages.

Written Opinion of the International Searching Authority issued in International Application No. PCT/CA2020/051769, Mar. 18, 2021, 4 pages.

Farhat, Mohamed et al. "Nanoantenna harmonic sensor: theoretical analysis of contactless detection of molecules with light." Nanotechnology vol. 26,41 (2015): 415201. doi: 10.1088/0957-4484/2641/415201.

* cited by examiner

| JUNCTION | | DIODE | | |
|---|---|---|---|---|
| Capacitance | 8.20E-10 | Capacitance | 1.57E-11 | F |
| R Series | 82.228 | R Series | 151.23 | Ω |
| R Parallel | 2.94E+05 | R Parallel | 9.86E+07 | Ω |
| R Low Voltage | 1.99E+05 | R Low Voltage | 2.24E+08 | Ω |

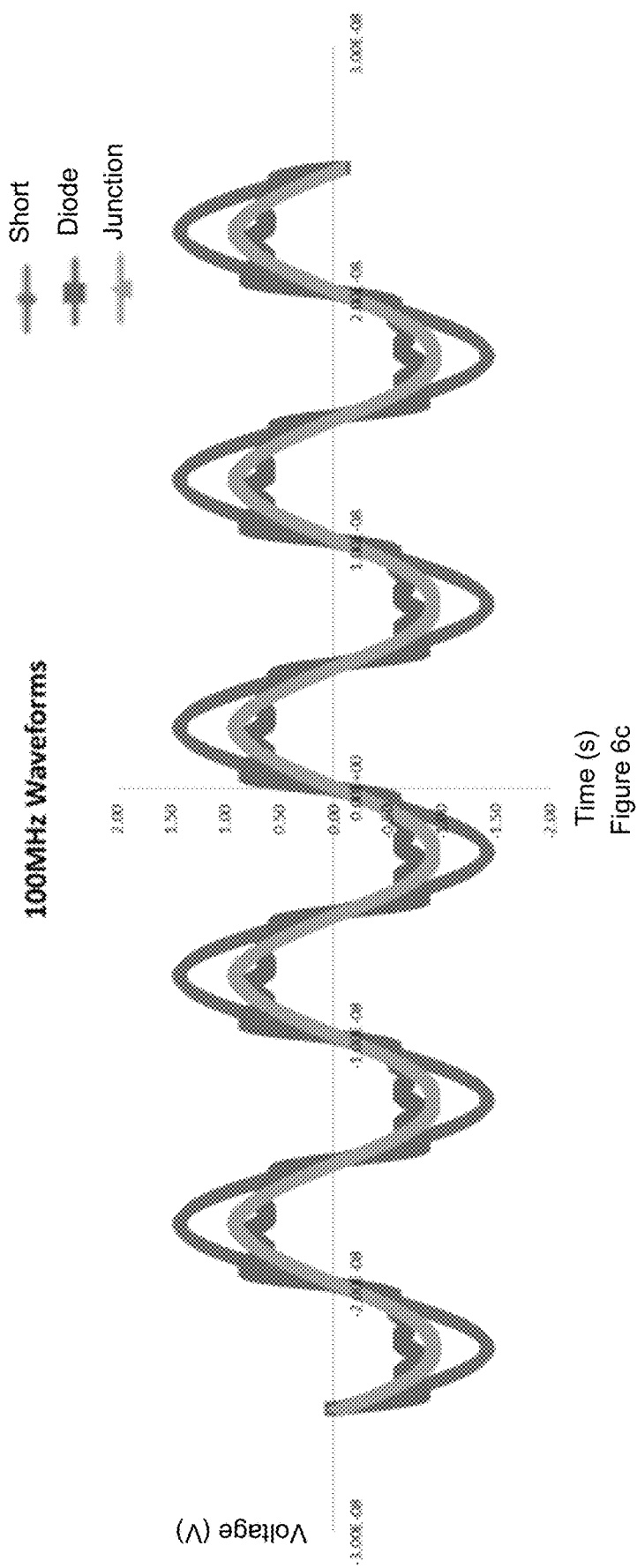

QUANTUM TUNNELING DEVICES FOR GENERATION OF HARMONICS IN PASSIVE WIRELESS TAGS AND SENSORS

FIELD

The present disclosure relates to wireless tags, and more particularly it relates to chipless, batteryless tags for remote identification, tracking, and examination of assets of interest.

BACKGROUND

The use of different wireless and/or contactless techniques for identifying and tracking various objects has increased significantly over the years. For example, harmonic radar and transponders have been used to track flying and walking insects in biological and agricultural studies. In such situations, an insect is equipped with a transponder, and an incoming interrogating signal at a frequency $f_0$ is re-radiated by the transponder at a frequency $nf_0$, where n is an integer. These harmonic radar tags have also been used for finding avalanche victims trapped under inches of snow. Given the fact that natural surroundings do not typically re-radiate at higher (also known as "harmonic") frequencies, these harmonic tags can improve identification and tracking of tagged objects. The transponder weight can be in the order of a few milligrams and can be detected across distances up to one kilometer.

Many of the harmonic transponder designs that are either found in the literature or commercially available are implemented using the second harmonic frequency $2f_0$ partly due to frequency allocations and because the best transponder conversion efficiency is typically obtained at this frequency. Generation of the signal at harmonic frequencies requires nonlinear current-voltage (I-V) behaviour of at least some components of the tag. A state-of-the-art tag in use today comprises a dipole antenna e.g. two lengths of wire, connected to a commercial, off-the-shelf Schottky diode. However, this design suffers from numerous drawbacks such as the limited choice of appropriate diodes and related I-V and capacitive characteristics that are sought in order to optimize the performance of the harmonic tag, and the size, weight, and cost of the discrete diode component.

SUMMARY

In one of its aspects, there is provided a harmonic radar tag comprising:
  an antenna structure;
  a tunneling structure electrically coupled to the antenna; and
  wherein the harmonic radar tag when stimulated by radiation at a first frequency responds by producing radiation at a second frequency different from the first frequency.

In another of its aspects, there is provided a tag detection system comprising:
  a source for producing an interrogation signal having a first frequency;
  a harmonic radar tag comprising:
    an antenna structure;
    a tunneling junction electrically and integrally coupled to the antenna; and
  wherein the harmonic radar tag when stimulated by the interrogation signal having the first frequency, and the harmonic radar tag produces a response signal at a second frequency different from the first frequency.

In another of its aspects, there is provided a method of manufacturing a harmonic radar tag, the method comprising the steps of:
  (a) selecting an insulating layer material, a first electrode metal and a second electrode metal;
  (b) conditioning the insulating layer material to facilitate tunneling of electrons therein;
  (c) depositing insulating layer material on first metal electrode and placing second metal electrode on deposited insulating layer material to form a metal-insulator-metal (MIM) tunnel structure having a MIM junction;
  (d) tuning the insulating layer to tune the symmetry of the MIM tunnel structure response to optimize the odd and even harmonics, or to provide for distinct identification patterns of the MIM junction; and
  (e) integrating the MIM tunnel structure with an antenna.

Advantageously, metal-insulator-metal (MIM) tunneling junctions with tunable characteristics are employed to obtain nonlinear current-voltage behaviour for generating harmonic backscatter in wireless tags and sensors. MIM junctions are known to exhibit a nonlinear I-V characteristic due to quantum tunneling of electrons through the thin insulating layer. Such junctions may be intimately integrated with the antenna structure, thus eliminating the need for a discrete diode element between two parts of the antenna. Compared to the existing harmonic radar tags, present system and method, offers lower cost of production, lower mass, tunability of the harmonic signature, improved performance and optional sensing through changes in the harmonic signature in response to a stimulus. Furthermore, the cost of passive remote sensors for industrial, agricultural, traffic, military, and environmental monitoring is greatly reduced.

BRIEF DESCRIPTION OF THE DRAWINGS

FIG. 6c shows a diode vs junction waveform operating at 100 MHz;

DETAILED DESCRIPTION OF EXEMPLARY EMBODIMENTS

Figure 1:
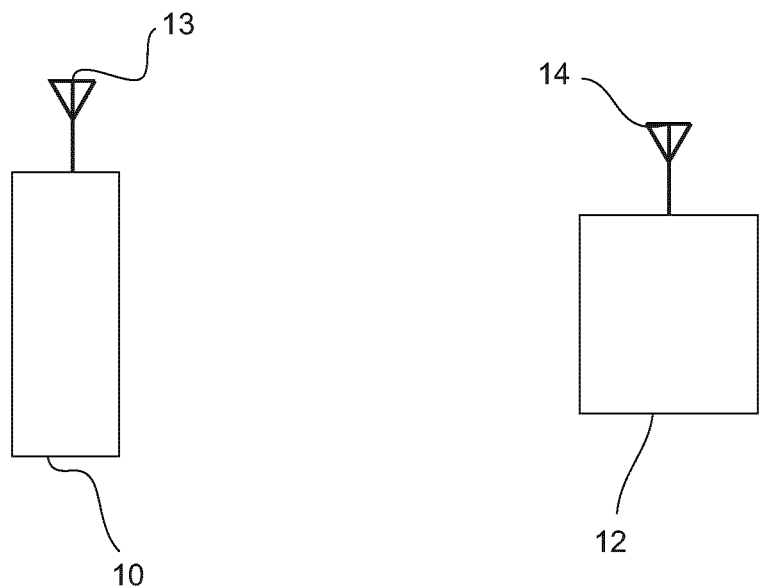
FIG. 1 shows a harmonic tag operating in conjunction with a radio frequency interrogator.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the invention in any way. Indeed, for the sake of brevity, certain sub-components of the individual operating components, and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 2:
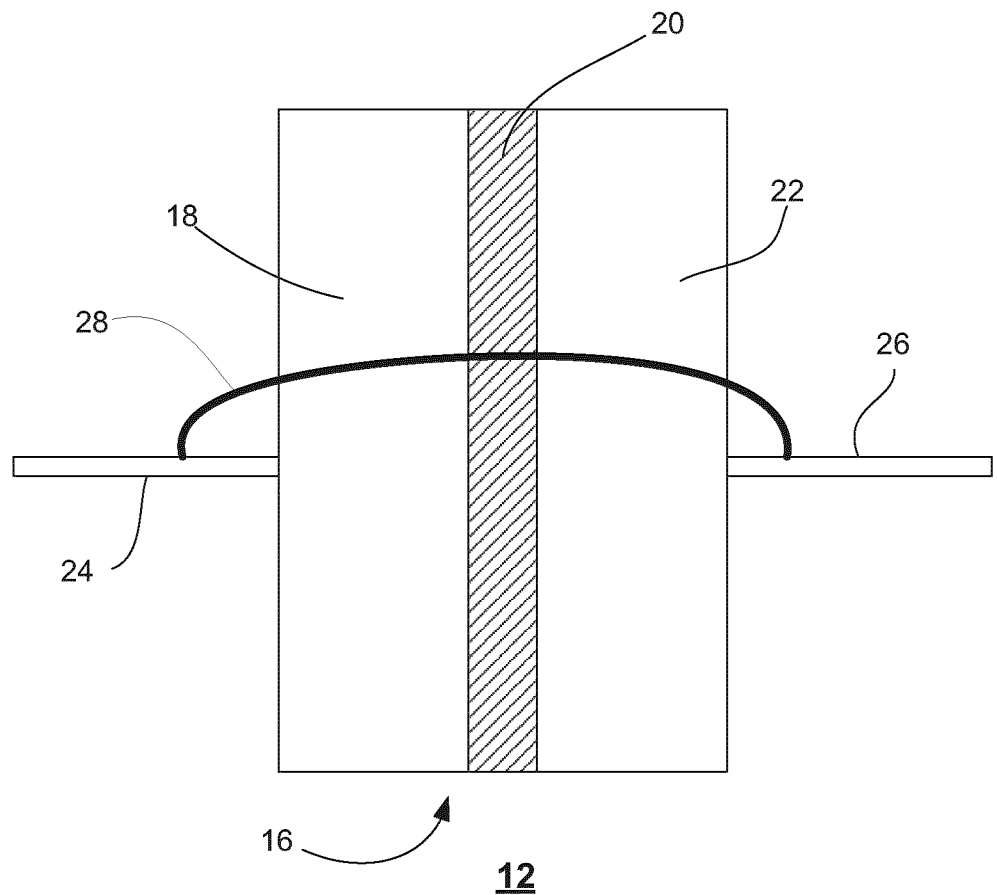
FIG. 2 shows a tunnel junction structure.

Referring to FIGS. 1 and 2, there is shown a top-level diagram of a harmonic tag, as shown generally by reference numeral 10, operating in conjunction with an appropriate radio-frequency interrogator 12, such as a harmonic radar, with antenna 13. Tag 10 comprises antenna 14 coupled to tunnel structure 16 forming a metal-insulator-metal junction. Generally, metal-Insulator-Metal (MIM) tunnel junction 16 is a sandwich structure consisting of metal electrode 18, insulating layer 20 and additional metal electrode 22, as shown in FIG. 2. MIM device 16 works on the principle of quantum tunneling whereby when a voltage is applied across the electrodes 18, 22, electrons tunnel from one metal electrode 18 to the other metal electrode 22 through insulating barrier layer 20. Barrier layer 20 can either be a native oxide of any one of the metal electrodes 18, 22, or a non-native one. By using metal electrodes 18, 22 sandwiching a relatively thin barrier 20, relatively low turn on voltages can be acquired and usage at relatively high frequencies is possible. MIM quantum tunnelling junction 16 is designed to exhibit nonlinear current-voltage behavior for generating harmonic backscatter. Antenna 14 is comprised of electrically conductive parts 24, 26 and transmission line 28 for matching the impedance of tunnel structure 16.

As will be described later, the following aspects of MIM device 16 play crucial roles in the working efficiency of the device, that is, top electrode, insulating layer, bottom electrode, geometry and configuration. Selection of the two electrodes determines whether MIM device 16 I-V response is asymmetric or symmetric. Generally, it is desirable to achieve high degrees of asymmetry and nonlinearity in the current-versus-voltage (I-V) curve in MIM devices. The differential resistance of device 16, which corresponds to the sensitivity of device 16 to incoming electromagnetic energy, is directly related to the nonlinearity of the I-V curve.

Figure 3:
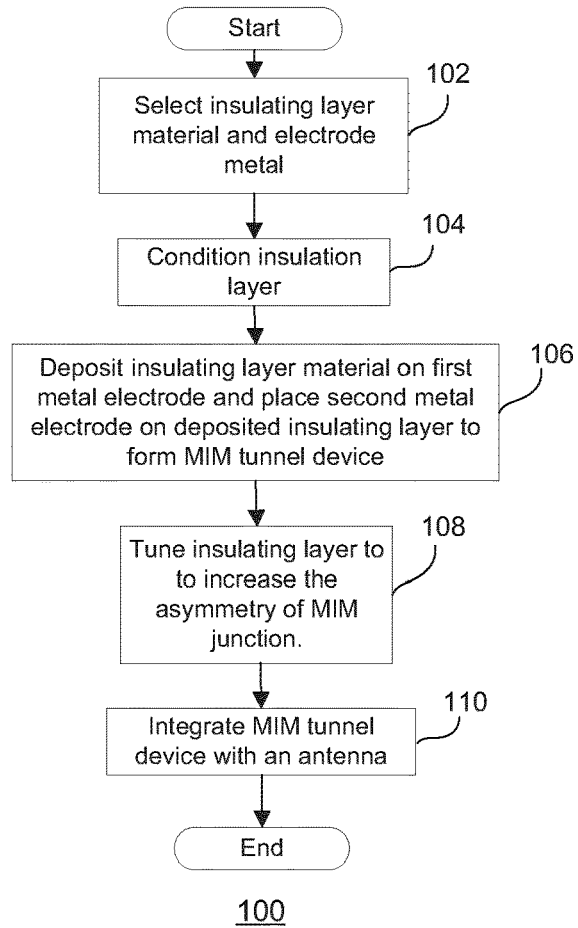
FIG. 3 shows a flowchart outlining exemplary steps for fabricating a harmonic tag with a desired high efficiency/sensitivity and tunable response frequency.

FIG. 3 shows flowchart 100 outlining exemplary steps for fabricating tag 10 with a desired high efficiency/sensitivity and tunable response frequency. In step 102, suitable insulating layer 20 and metal electrodes 18 and 22 are selected. Insulating layer 20 may be a dielectric layer, such as $SiO_2$ and metal electrodes 18 and 22 may be aluminum (Al) or nickel (Ni). Insulating layer 20 is conditioned to facilitate conduction (tunneling) of electrons (step 104). In step 106, insulating layer 20 is deposited on metal electrode 18, and metal electrode 22 is placed on top of insulating layer 20, such that insulating layer 20 is sandwiched between metal electrodes 18 and 22 to form stacked MIM device 16. Insulating layer 20 is deposited on metal electrode 18 using any suitable technique that allows for precise control of the uniformity of insulating layer 20, desired active area of the MIM junction 16, thickness of insulating layer 20. Exemplary utilizing deposition processes include thermal evaporation, sputtering (PVD), chemical vapor deposition (CVD), atomic layer deposition (ALD) and molecular beam epitaxy (MBE).

In next step 108, dielectric layer 20 is tuned to increase the asymmetry of MIM junction 16. Next, MIM tunnel device 16 is integrated with antenna 14 detecting incoming interrogation frequency from radio frequency interrogator 12, and radiating the response frequency from MIM device 16 (step 110).

In another implementation, MIM device 16 comprises dissimilar metal electrodes 18, 22, provided these electrodes 18, 22 yield sufficient non-linearity and asymmetry, and allows for significant current flow without external bias. In another implementation, harmonic radar tag 10 with tunneling junction 16 is responsive to an environmental stimulus. Accordingly, tunneling junction 16 can be built to respond to a specific stimulus by changing its current-voltage characteristic, thus leading to changes in the harmonic signature. For example, a direct current (DC) voltage bias will increase the asymmetry of the current-voltage response, leading to a more prominent 2nd harmonic vs. 3rd harmonic.

In another implementation, compression of the junction will lead to a shorter tunneling distance, and consequent changes in the harmonic signature, which can be exploited for remote sensing in addition to tracking. Examples of demonstrated response of tunnel junctions to stimuli: temperature, strain or pressure, light, acceleration, ionizing radiation, magnetic field.

In another implementation, tunnel junction 16 is a dipole antenna.

In another implementation, tunnel junction 16 is built on a piezoelectric substrate that biases tunnel junction 16 in response to mechanical stress. Accordingly, the current-voltage (I-V) characteristic becomes more or less asymmetric with the dc bias, leading to changes in the harmonic signature of tag 10.

In another implementation, tunnel junction 16 is deformable under stress, leading to changes in the tunneling distance and related I-V characteristic, leading to changes in the harmonic signature.

In yet another implementation, tunnel junction 16 designed to change its I-V behaviour in response to some environmental stimulus, which facilitates remote sensing by observing changes in the harmonic signature of the tag.

In yet another implementation, tunnel junction 16 is intimately integrated with antenna structure 12, eliminating the need for a discrete diode element. Therefore, harmonic tags may be manufactured at a lower cost, and may be fabricated by 3D printing and/or may include flexible substrates, textiles, commercial products, packaging, etc.

In yet another implementation, the manufacturing process of tunnel junction 16 enables customization and optimization of the I-V characteristic, impedance, and the capacitance of the junction to better match the application requirements. Consequently, a specific and unique harmonic signature of tag 10 can be obtained to aid in identification of tracked assets.

Figure 4:
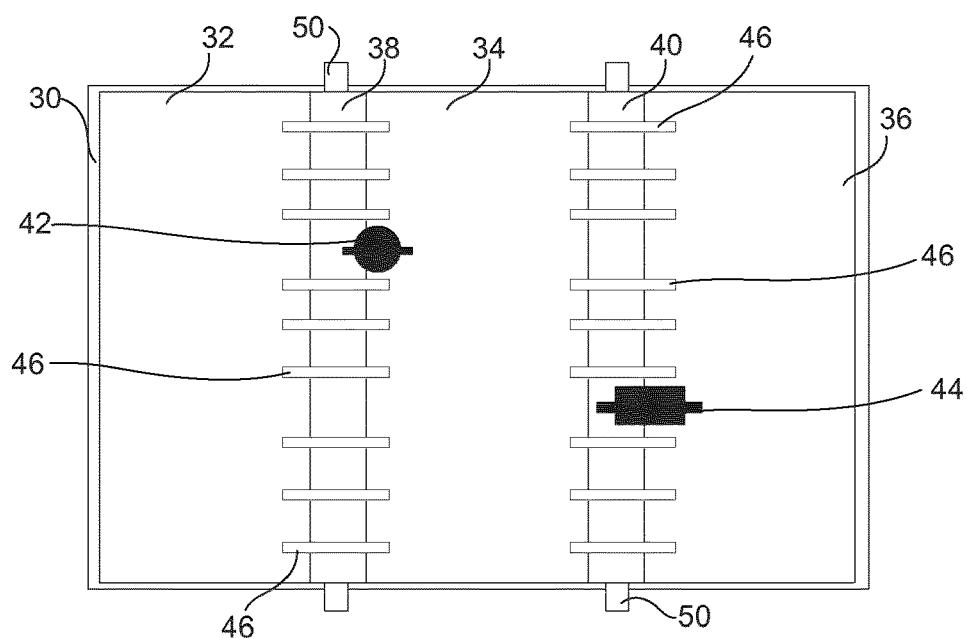
FIG. 4 shows an experimental setup for comparing a molecular junction to a diode pair.
Figure 5A:
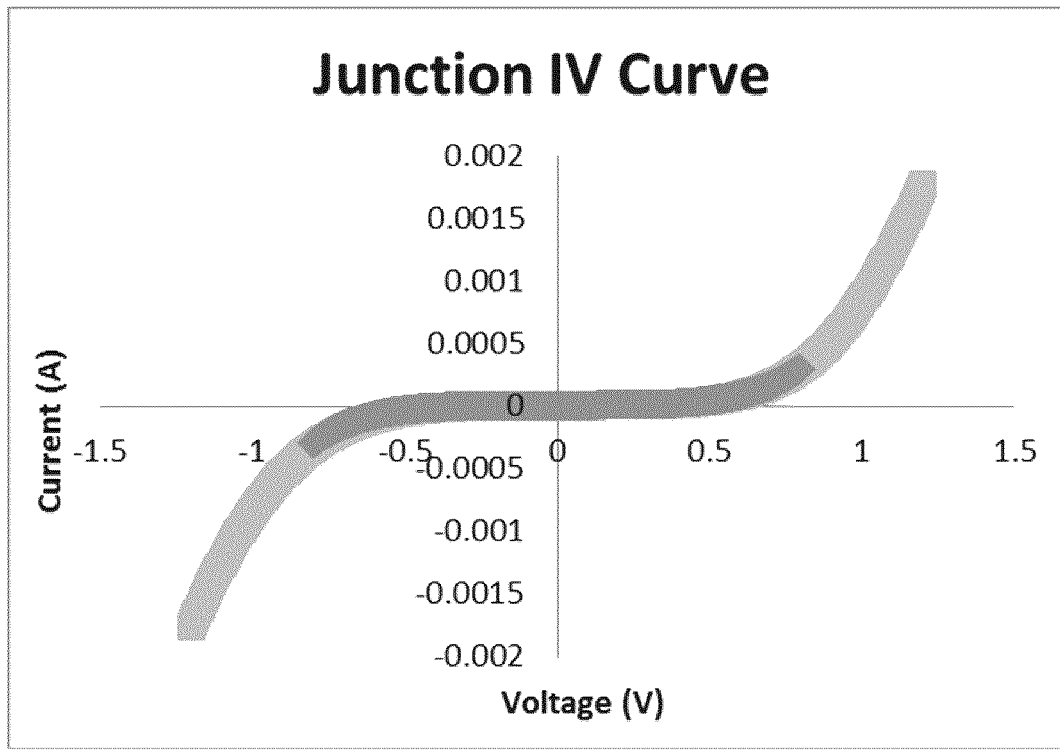
FIG. 5a shows a junction I-V curve.
Figure 5B:
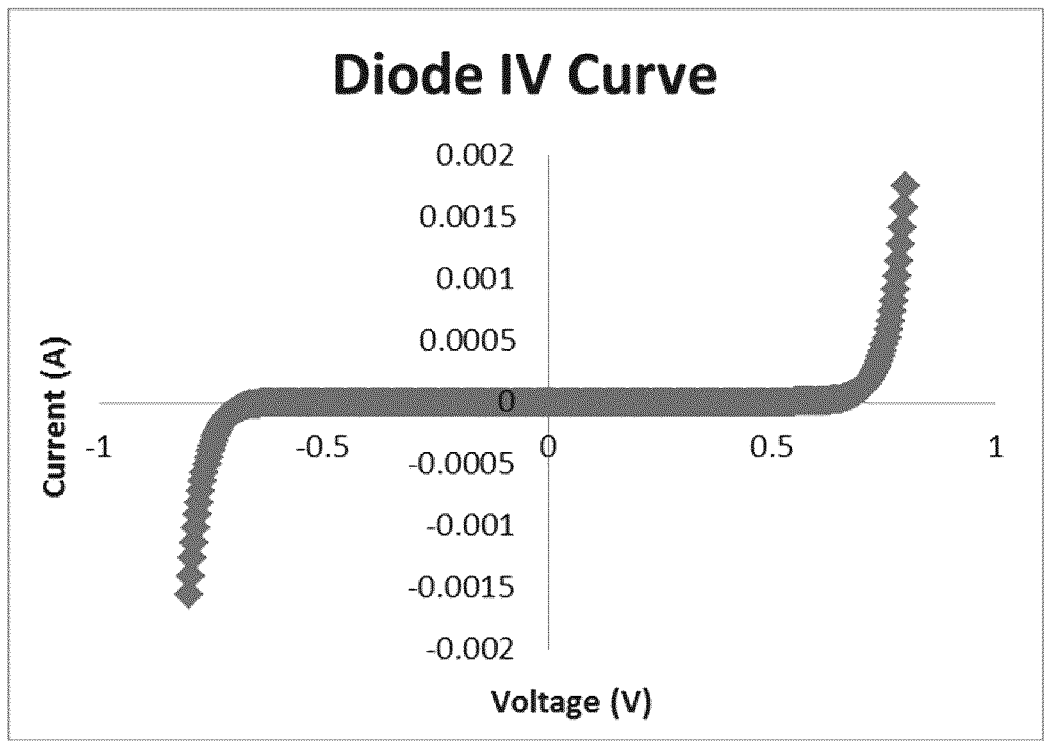
FIG. 5b shows a diode I-V curve.
Figure 5C:
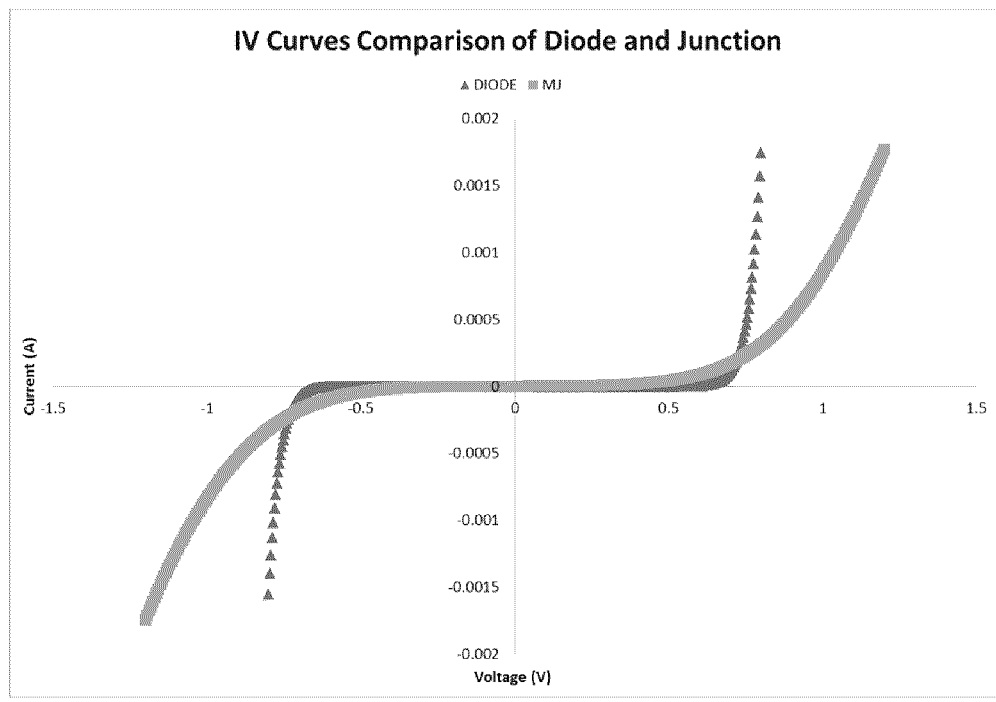
FIG. 5c shows a comparison of the junction I-V curve.
Figure 5D:
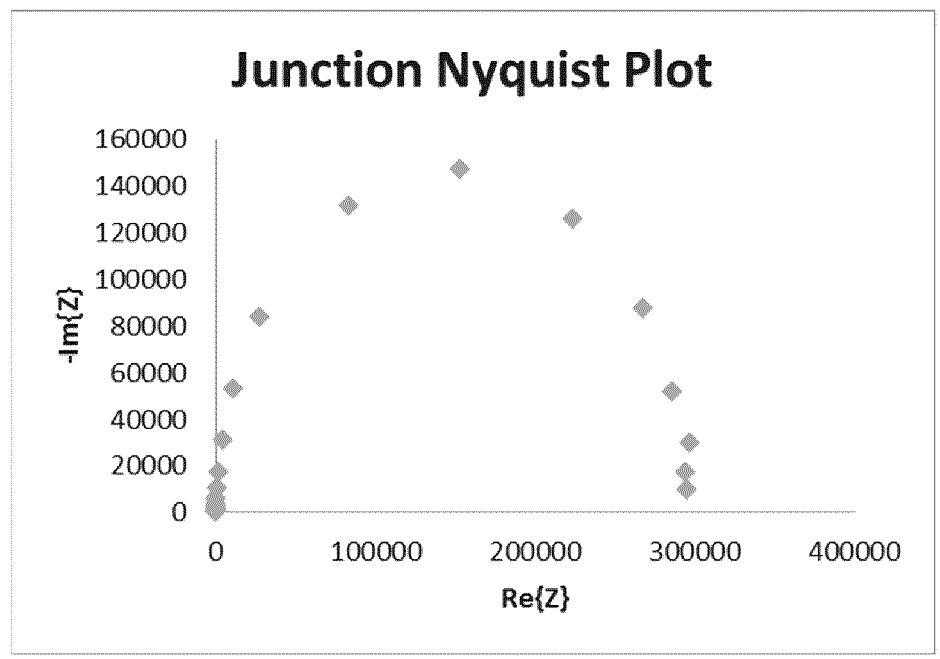
FIG. 5d shows an junction Nyquist plot.
Figures 5E, 5F:
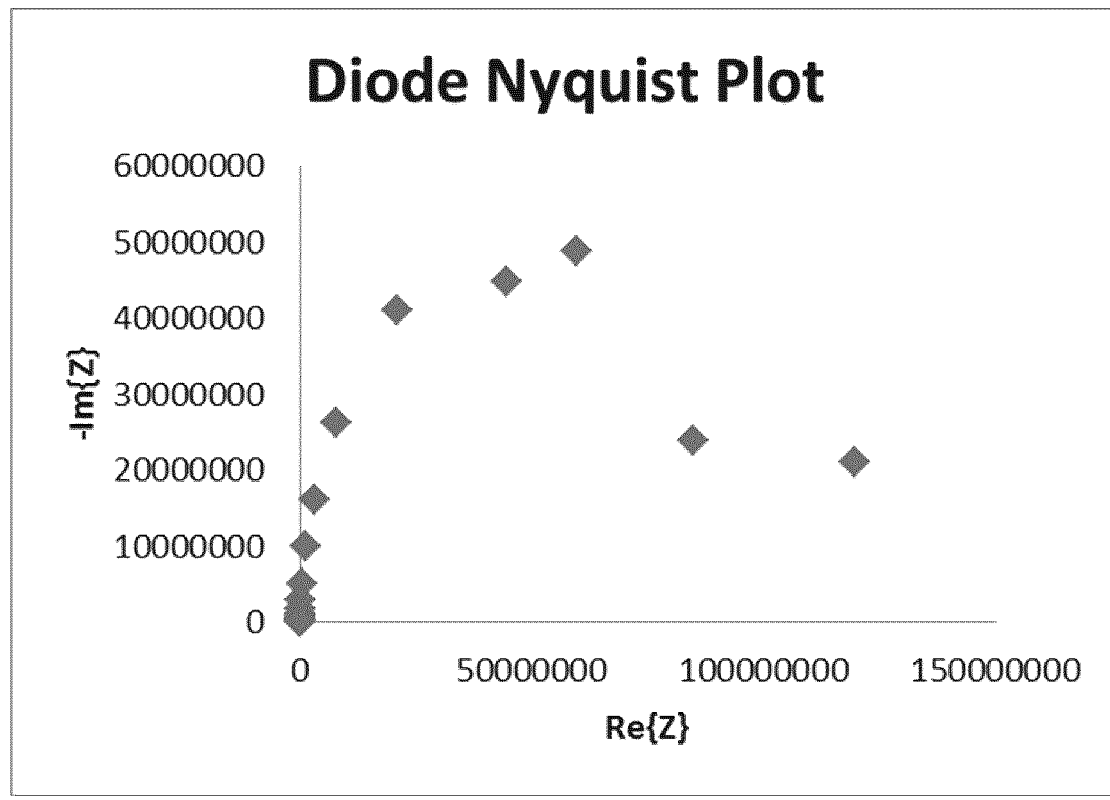
FIG. 5e shows a diode Nyquist plot.
FIG. 5f shows a table with characteristics of the molecular junction and the diode pair.
Figure 6A:
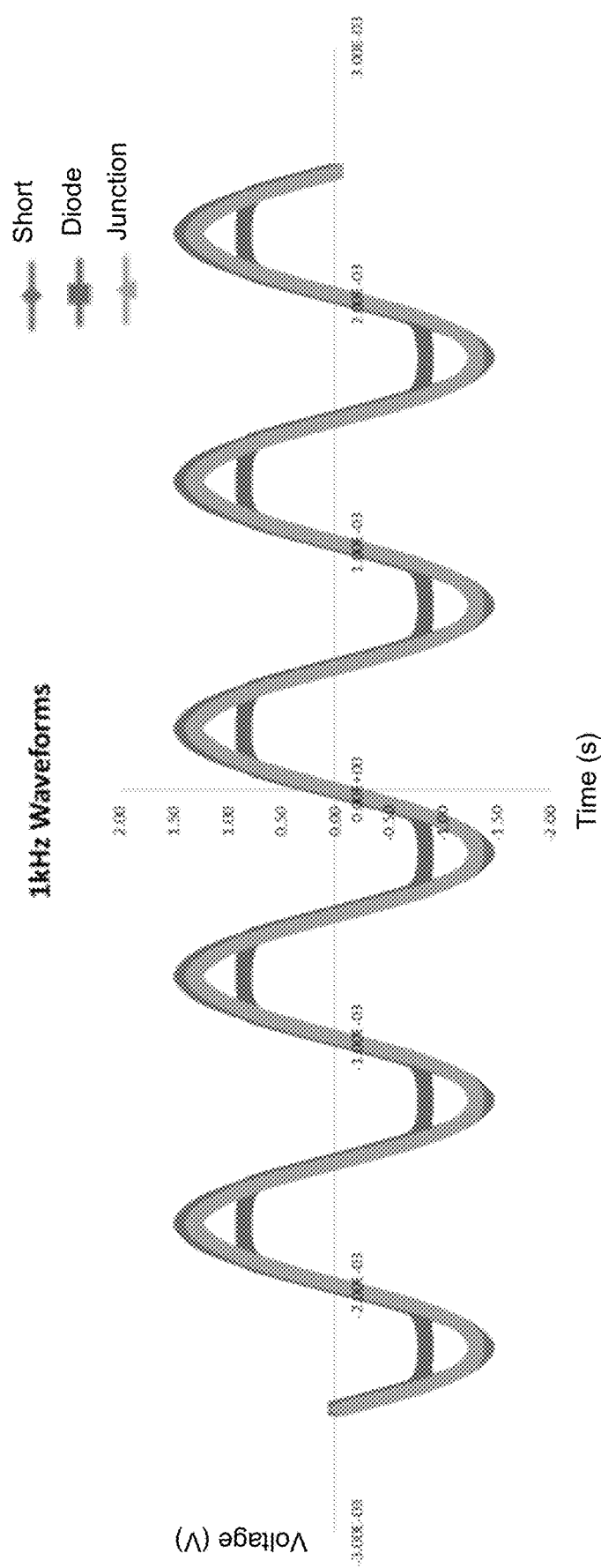
FIG. 6a shows a diode vs junction waveform operating at 1 kHz.
Figure 6B:
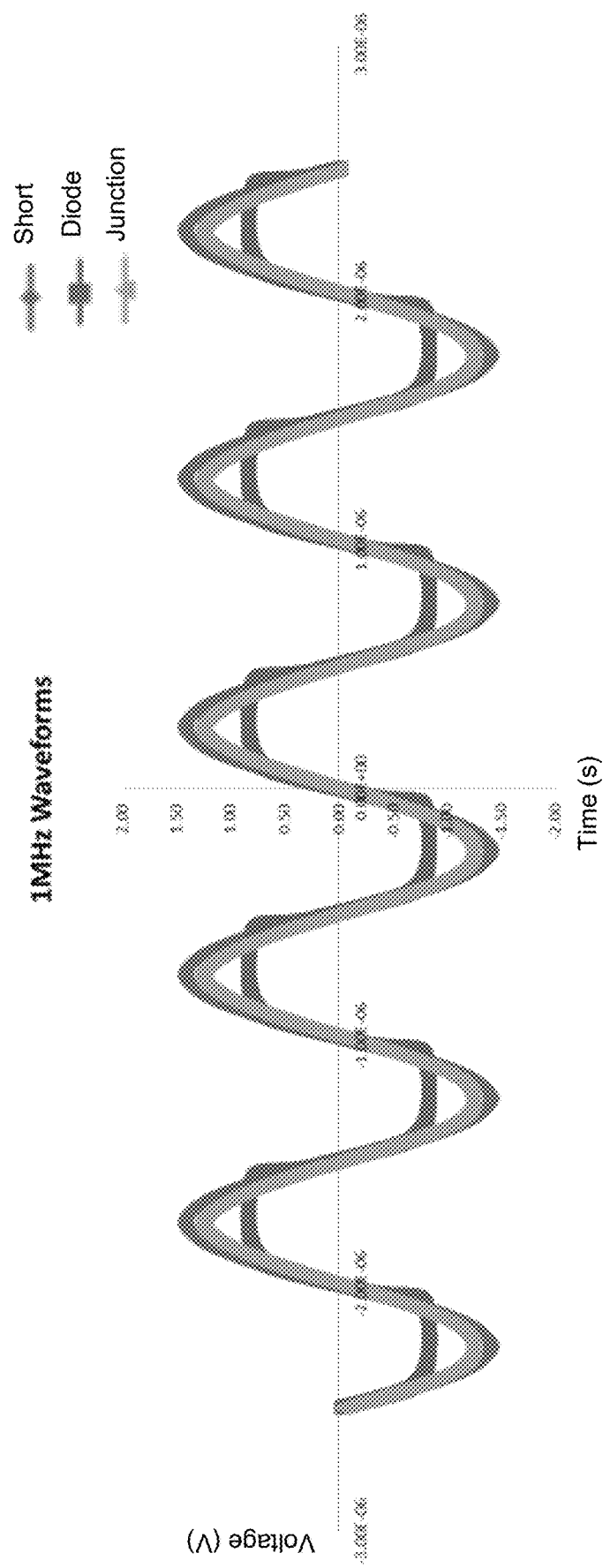
FIG. 6b shows a diode vs junction waveform operating at 1 MHz.
Figure 7A:
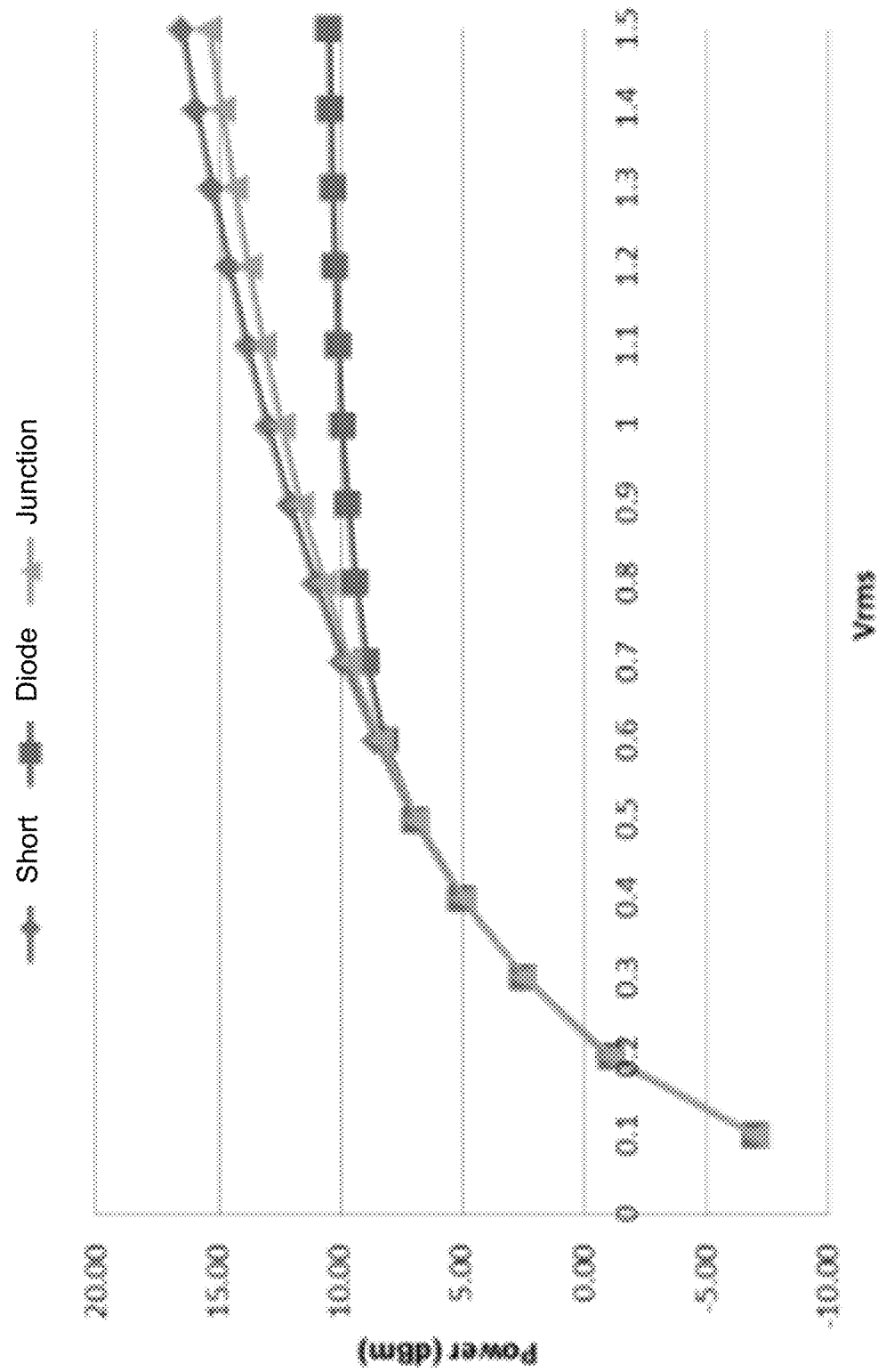
FIG. 7a -e shows various harmonics of diode vs junction power spectra operating at 1 kHz.
Figure 7B:
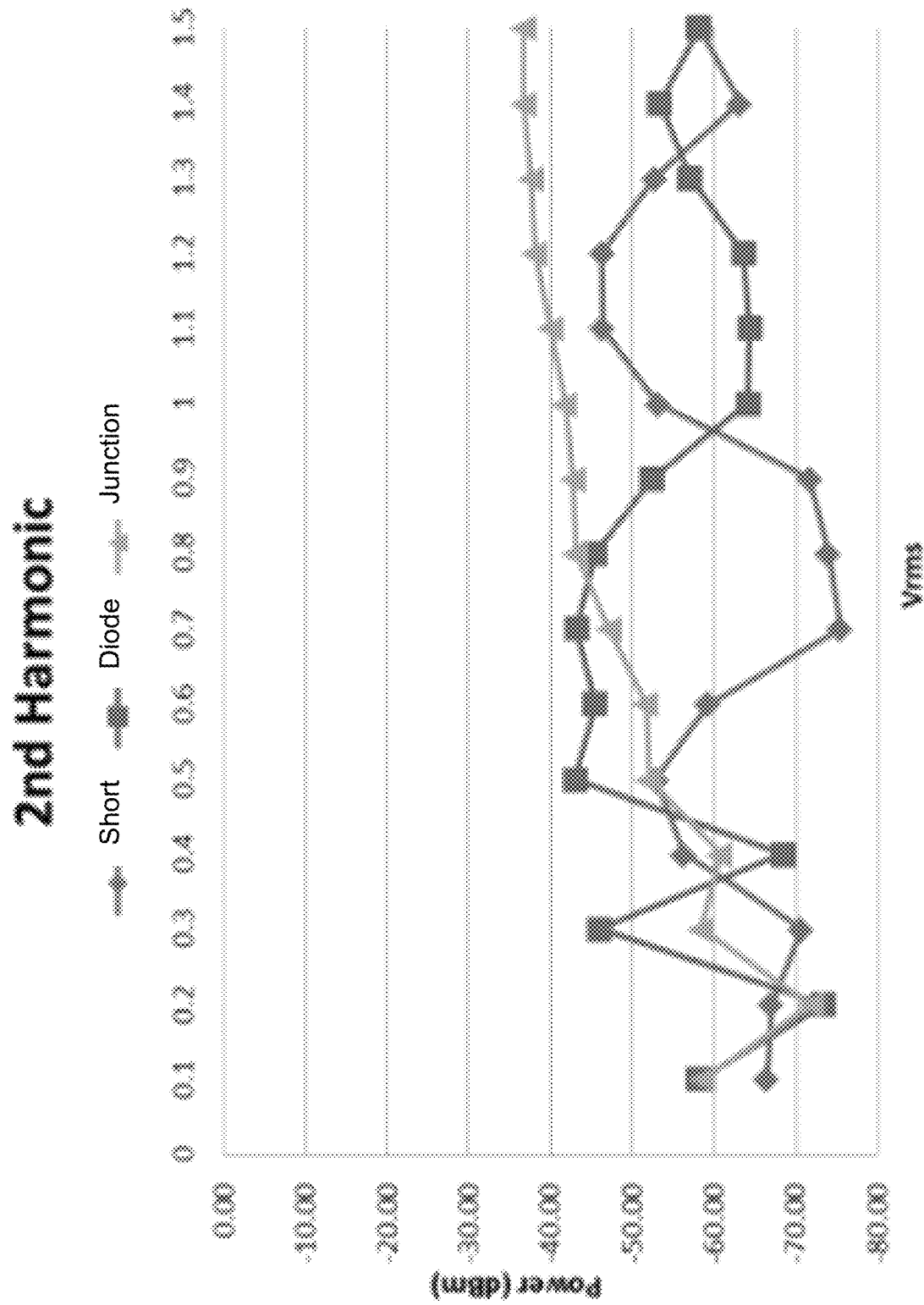
Figure 7C:
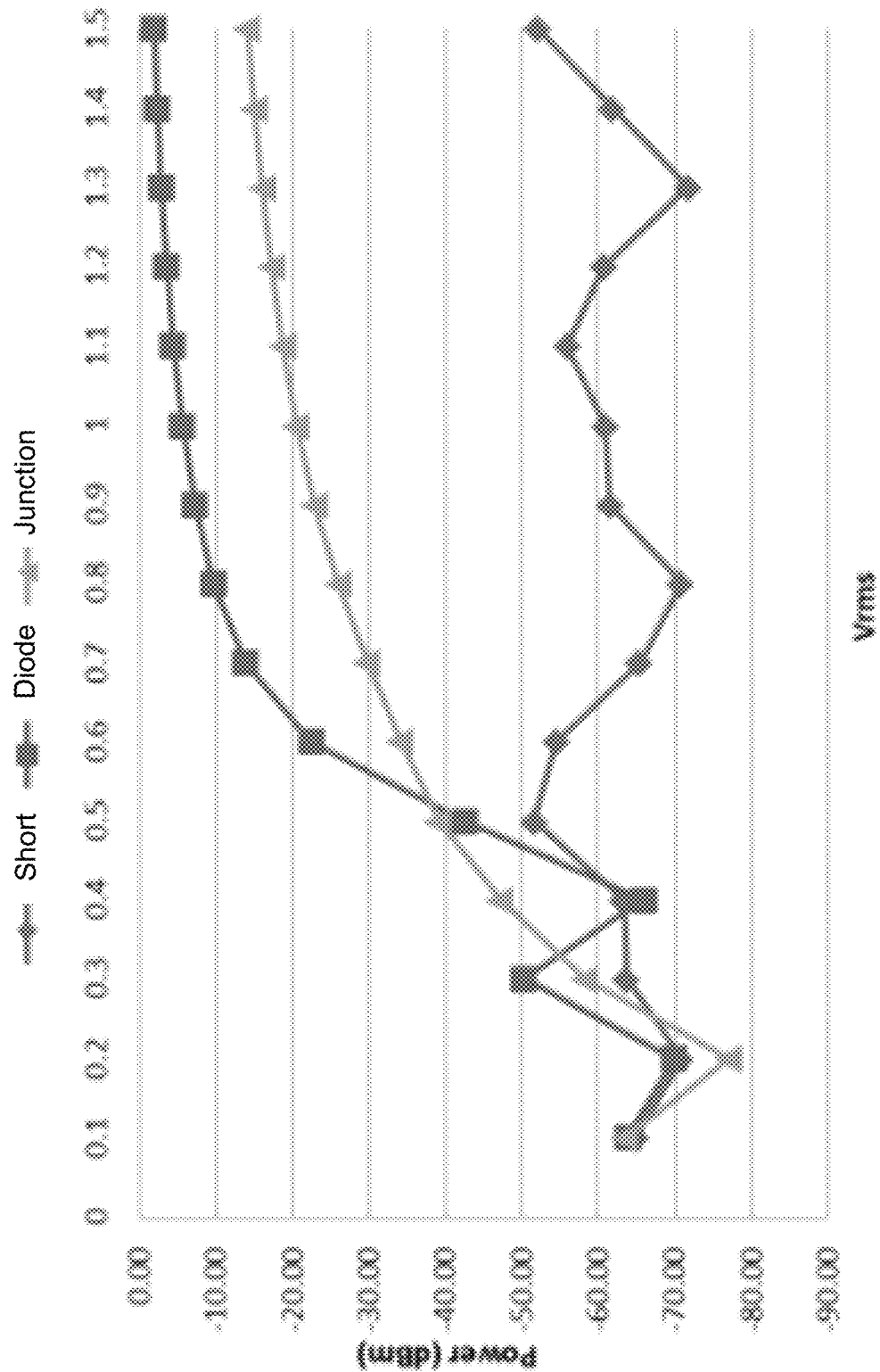
Figure 7D:
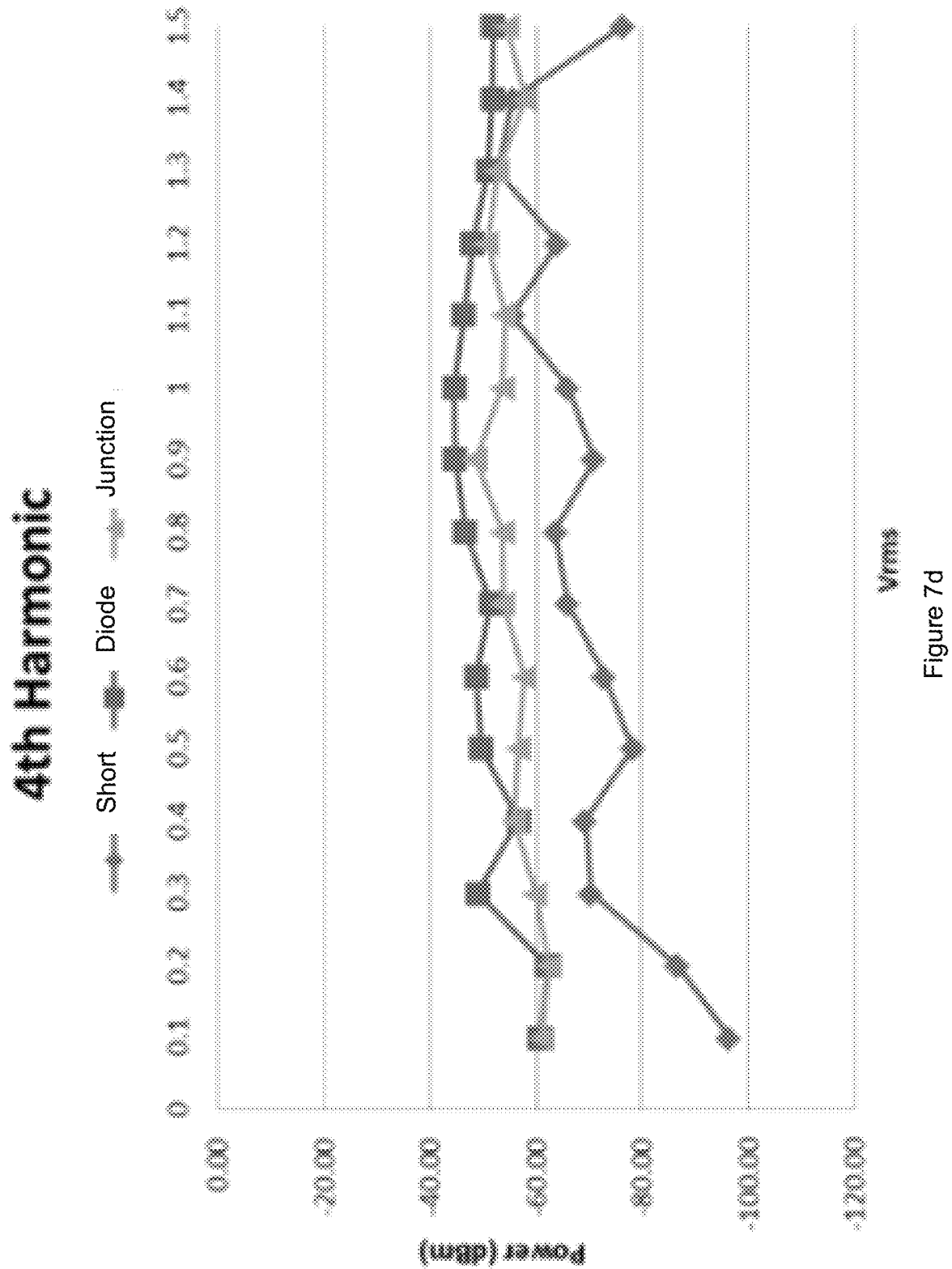
Figure 7E:
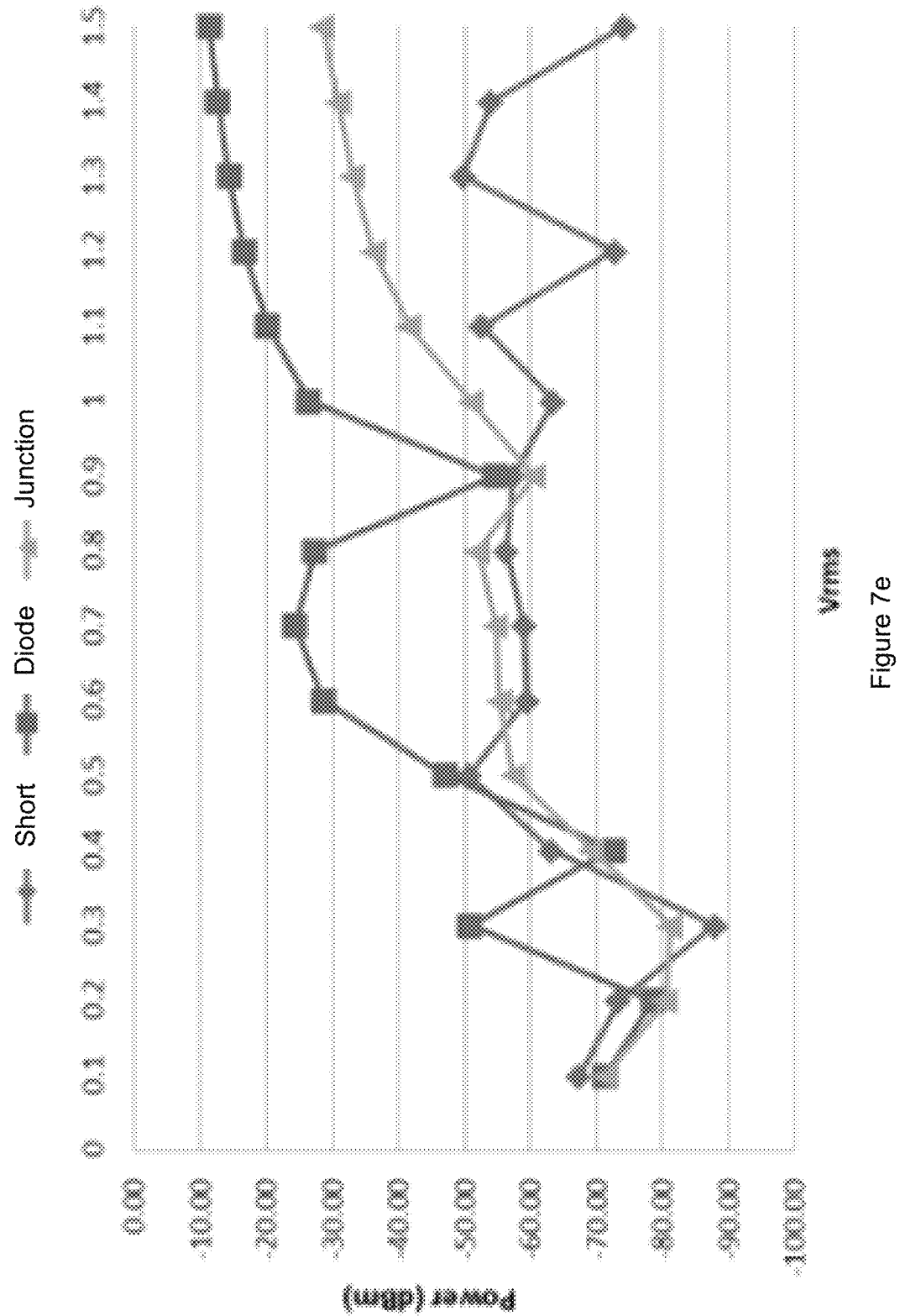
Figure 7F:
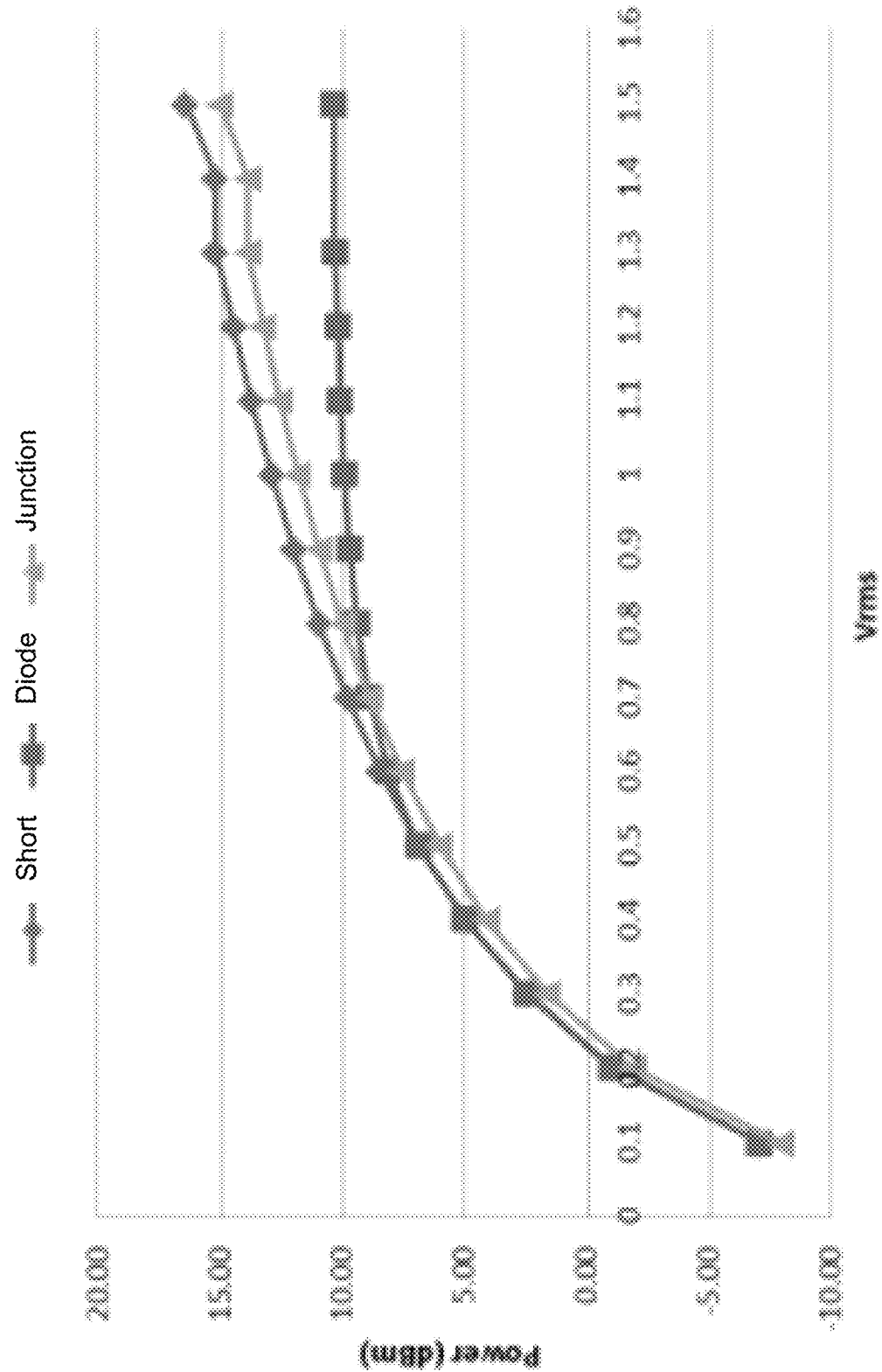
FIG. 7f-j shows various harmonics of diode vs junction power spectra operating at 1 MHz.
Figure 7G:
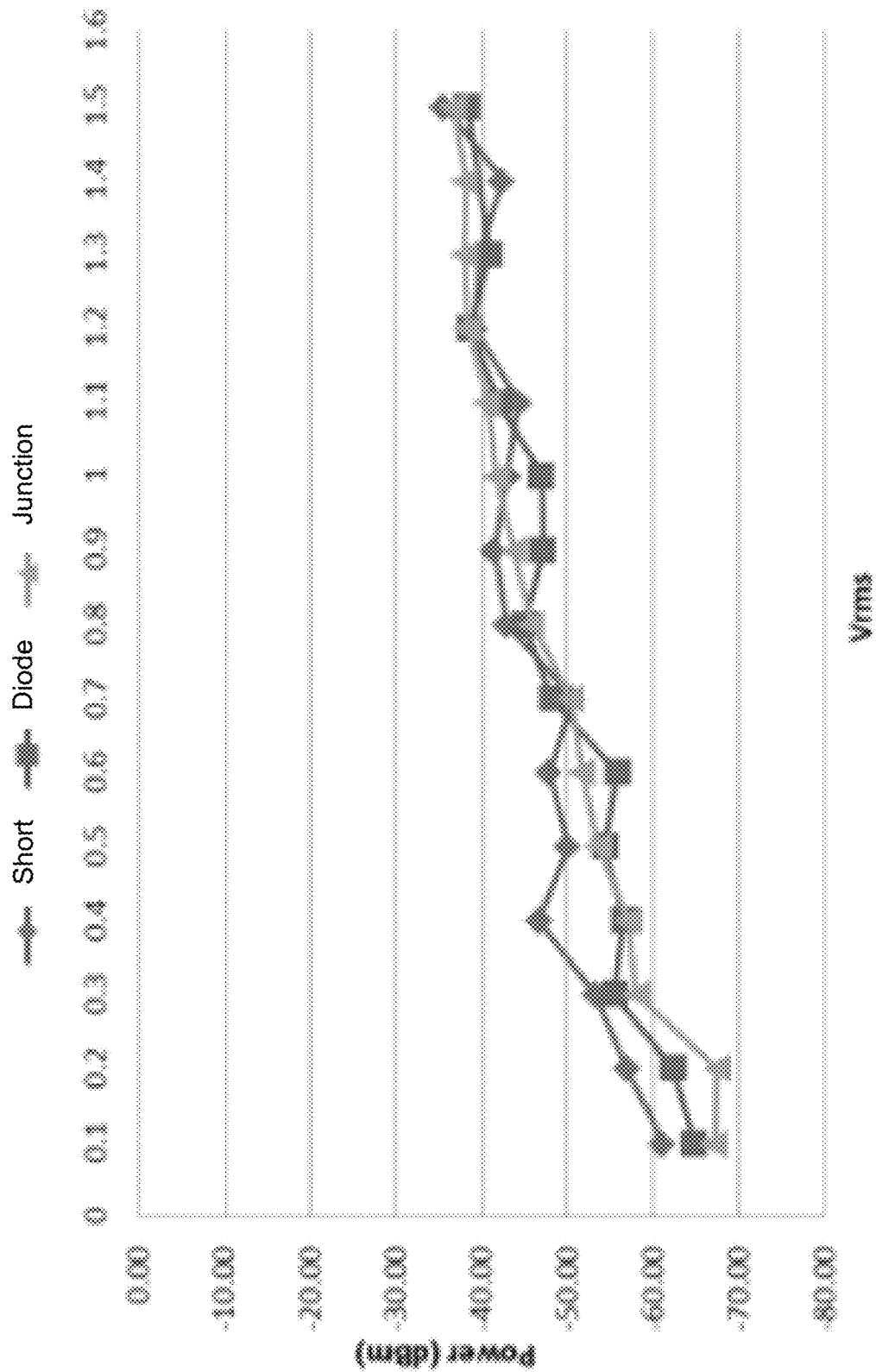
Figure 7H:
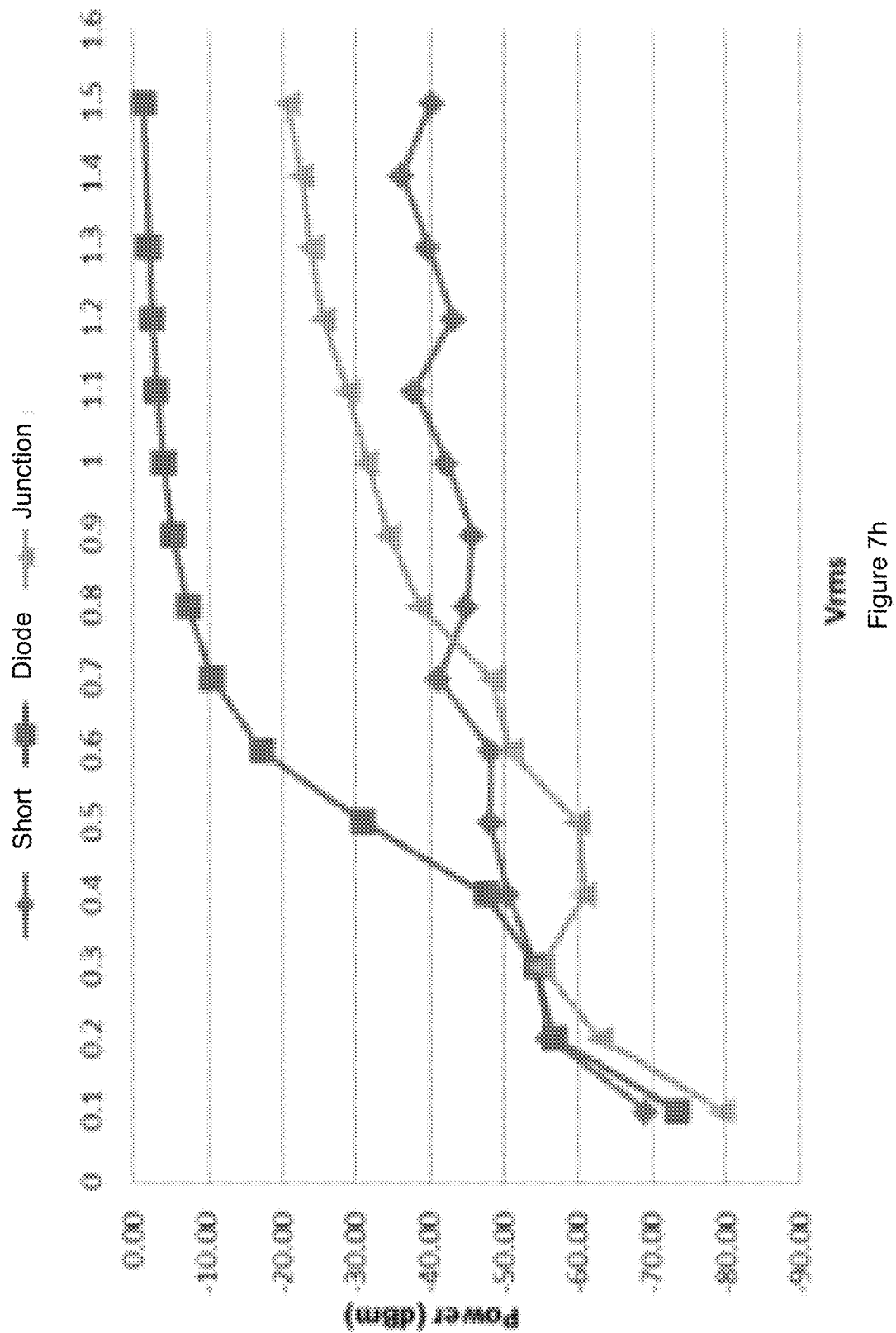
Figure 7I:
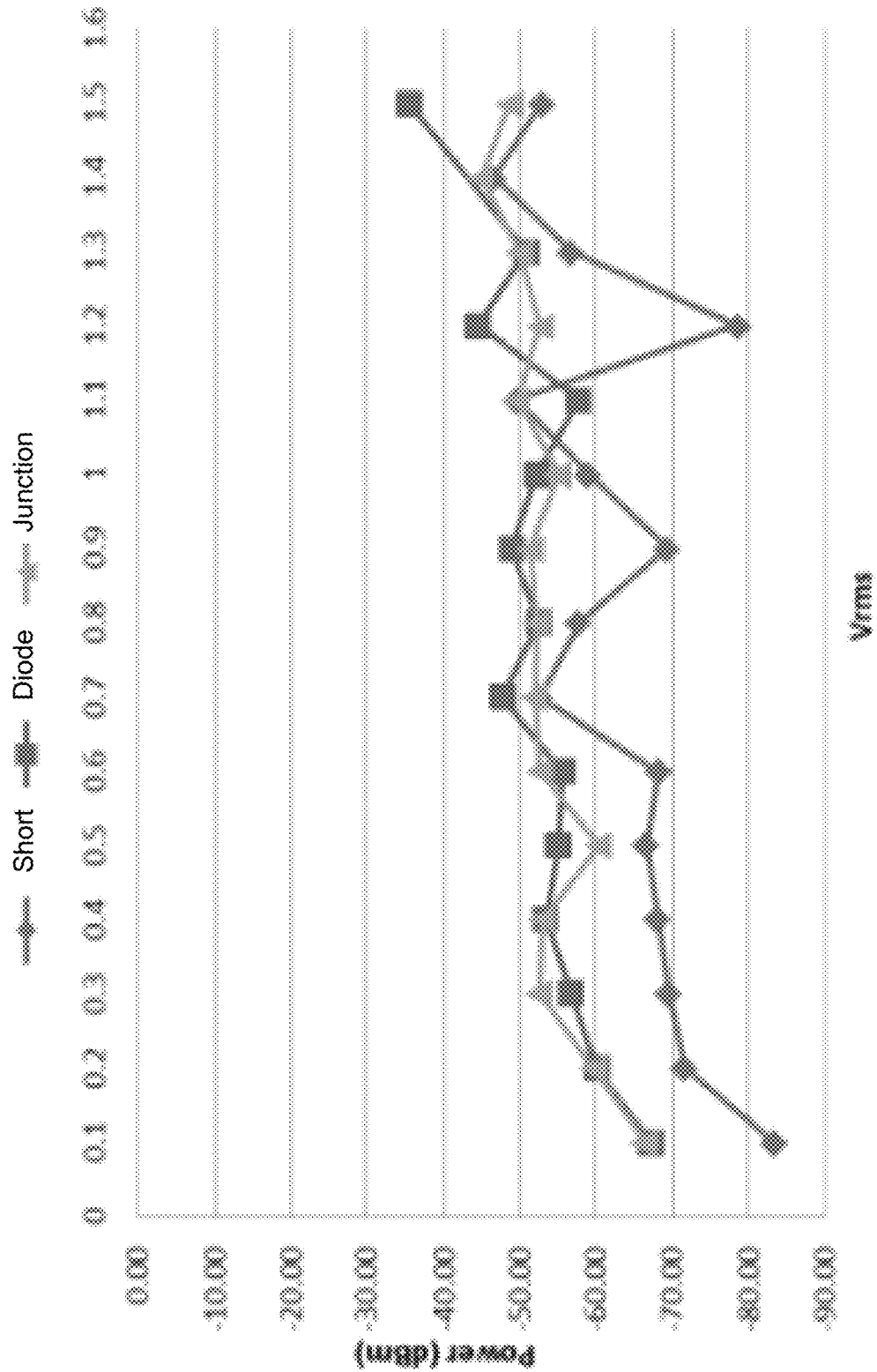
Figure 7J:
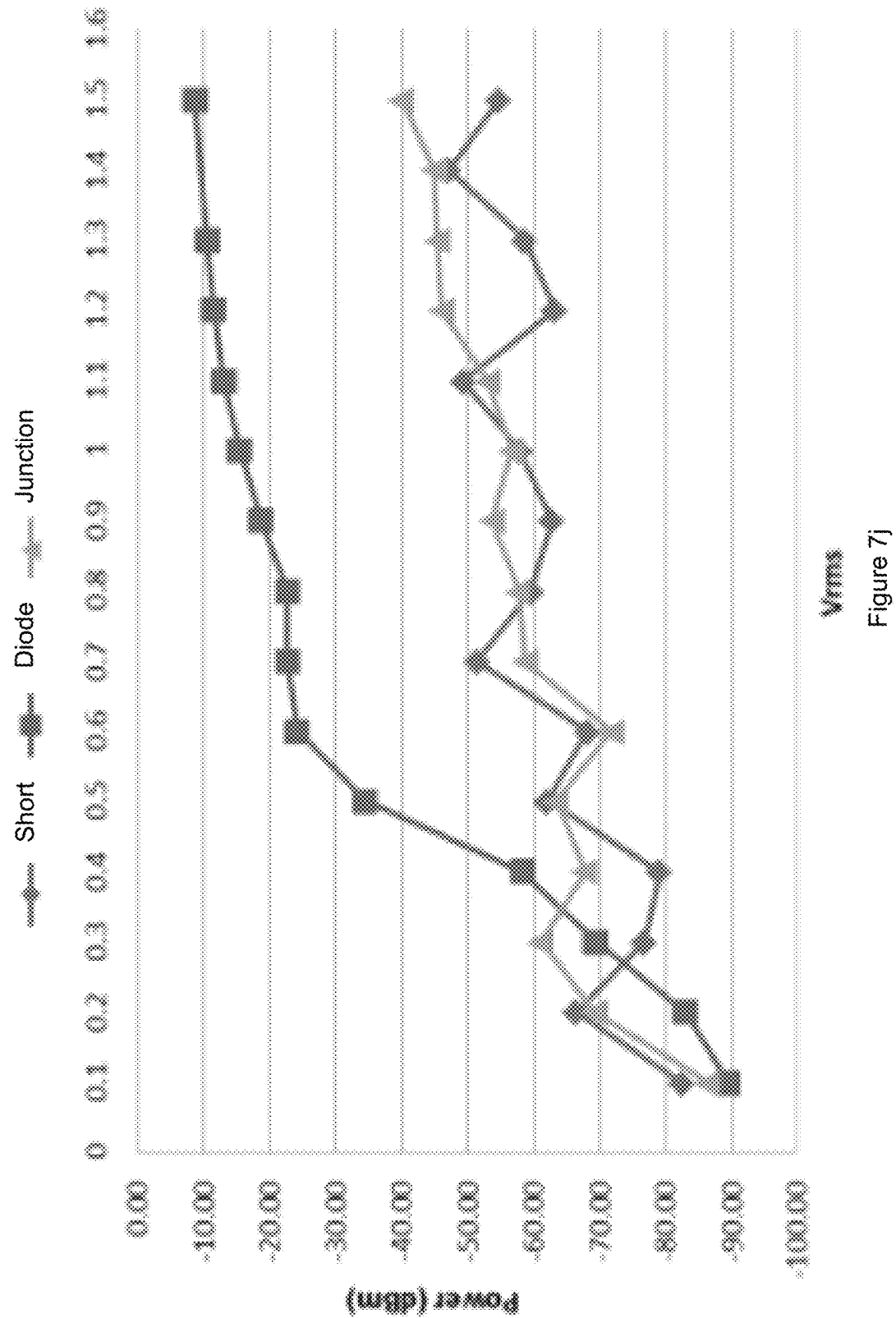
Figure 8A:
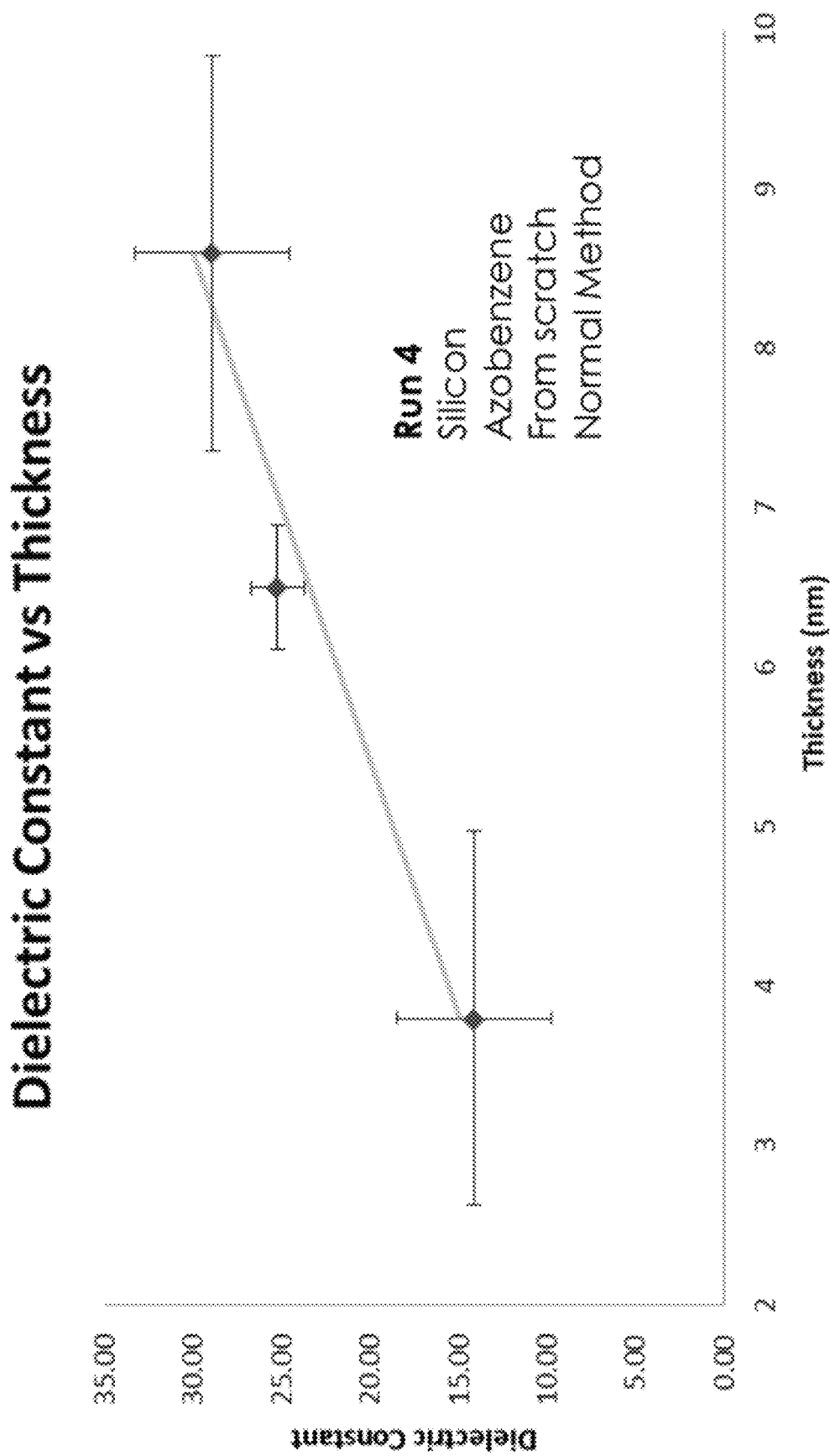
FIGS. 8a to 8d show various dielectric constant vs thickness for molecular junctions.
Figure 8B:
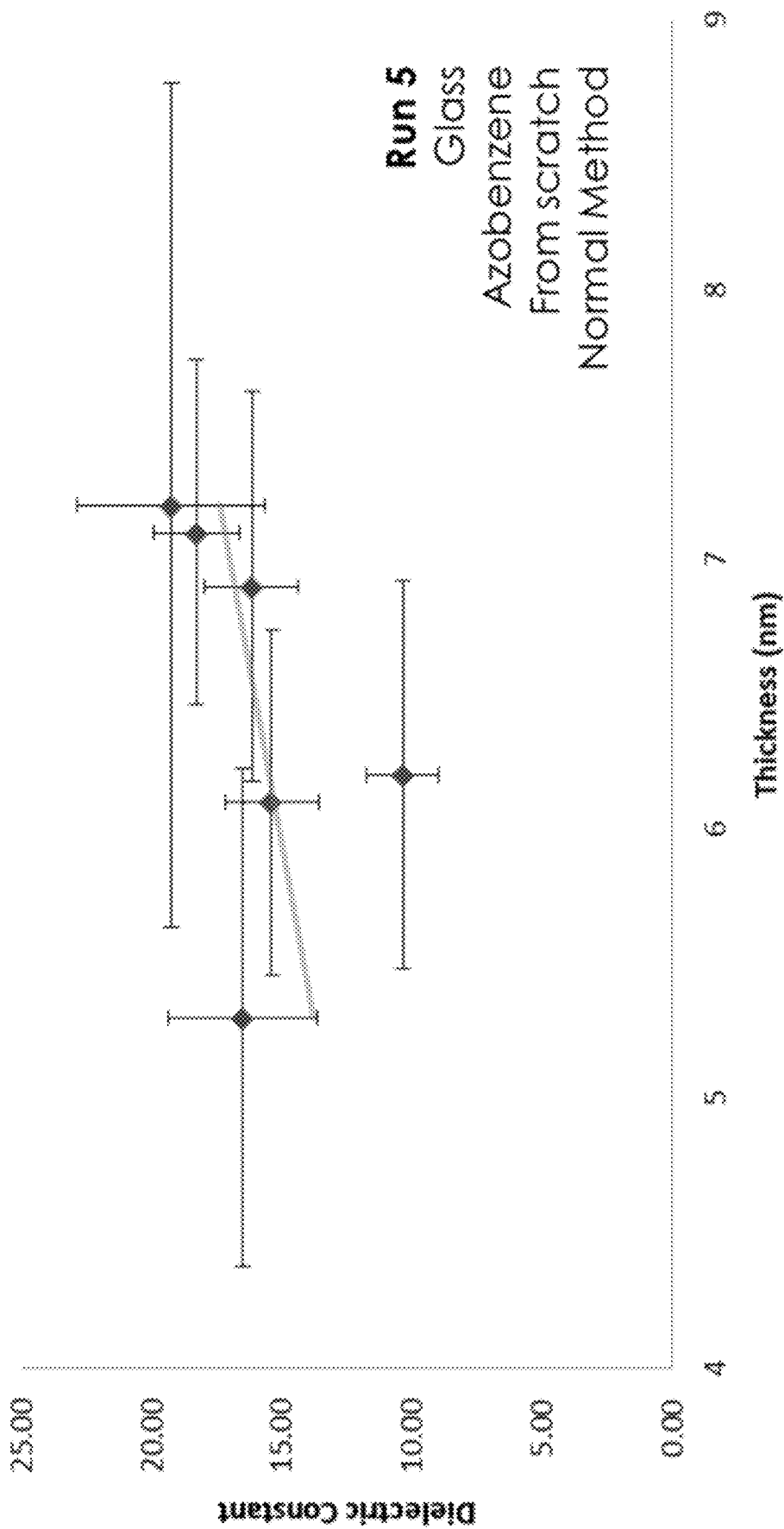
Figure 8C:
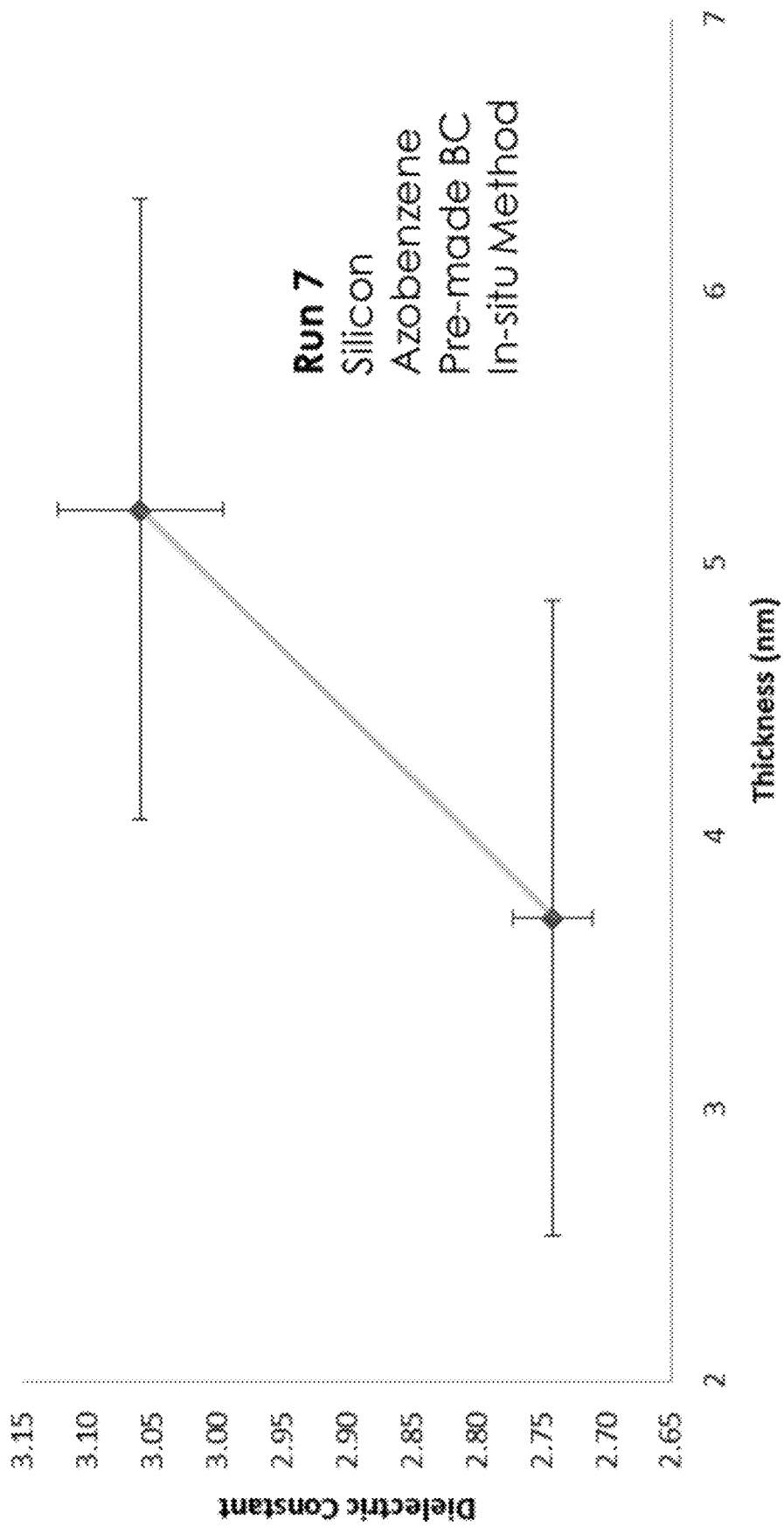
Figure 8D:
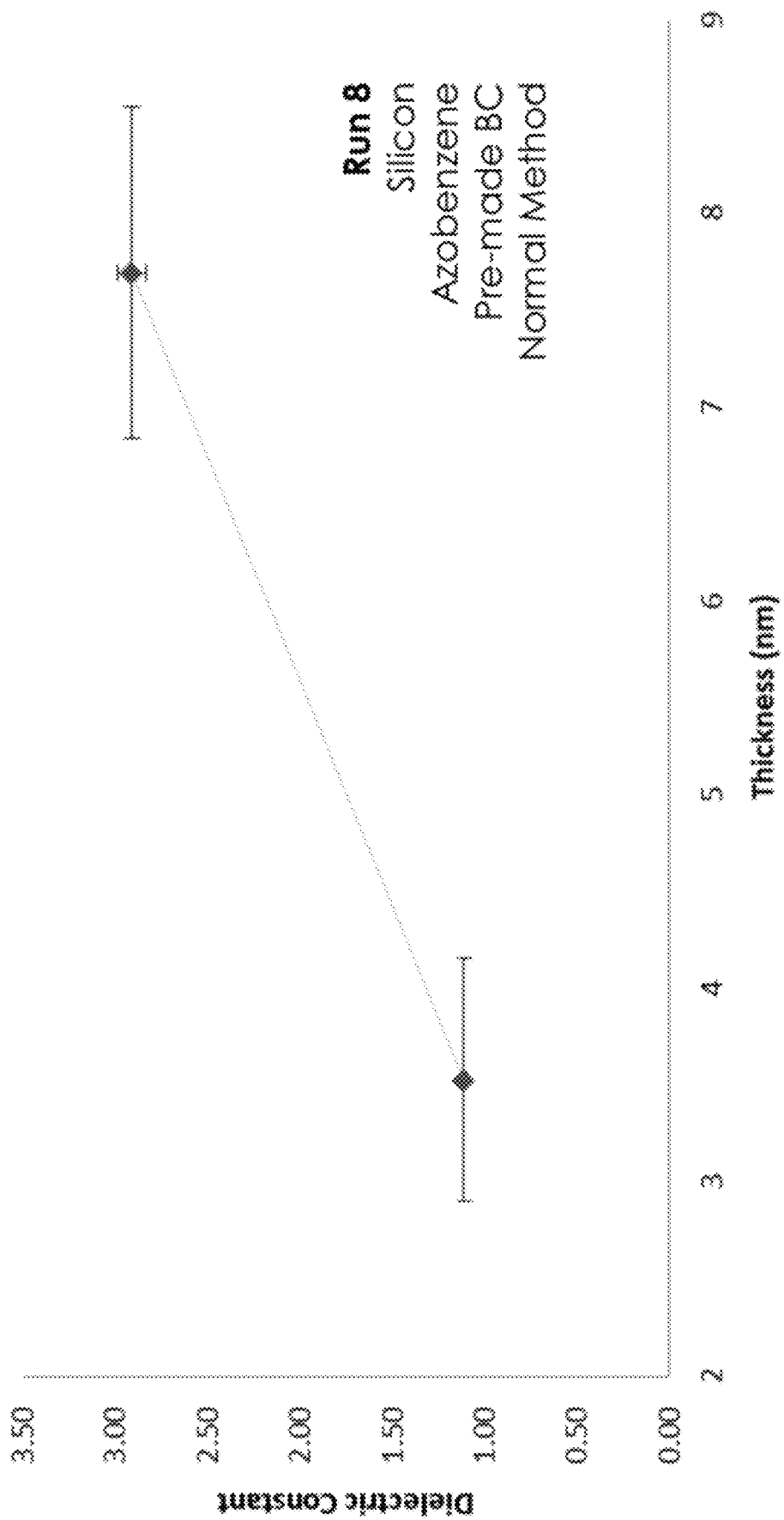

In one experiment the capabilities of a molecular junction are compared to a diode pair. As shown in FIG. 4, PCB board 30 includes copper ground planes 32, 34 and 36, with first etched track 38 between copper ground planes 32, 34 and second etched track 40 between copper ground planes 34, 36. Diode pair 42 is connected between copper ground plane 34 and first etched track 38, while junction pair 44 is connected between copper ground plane 36 and second etched track 40. Metallic arches 46 electrically connect copper ground planes 32, 34 and 36, to each other, and diode pair 42 and junction pair 44 are connected from track 38, 40, respectively, to ground in shunt. SubMiniature version A (SMA) connectors 50 are coupled to each end of each track 38, 40 for connecting to instruments. As an example, diode pair 42 is a HSMP3822 antiparallel PIN diode pair in a SOT-23-3 package. Results from the experiment are shown in FIGS. 5a-f; 6a-c; 7a-7j; and 8a-d.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

The invention claimed is:

1. A harmonic radar tag comprising:
   an antenna structure;
   a tunneling structure electrically coupled to the antenna structure; and
   wherein the harmonic radar tag when stimulated by radiation at a first frequency responds by producing radiation at a second frequency different from the first frequency.

2. The harmonic radar tag of claim 1, wherein the tunneling structure forms a tunneling junction, and the tunneling structure is integrated with the antenna structure.

3. The harmonic radar tag of claim 2, wherein the tunneling structure comprises at least one insulation layer separating a first conductive metal layer and a second conductive metal layer.

4. The harmonic radar tag of claim 3, wherein any one of a current-voltage curve, impedance, capacitance, and the second frequency is tunable by varying the dimension, geometry of the tunneling structure.

5. The harmonic radar tag of claim 4, wherein the tunneling structure is customizable without the requirement for semiconductor manufacturing infrastructure.

6. The harmonic radar tag of claim 5, wherein the tunneling structure is manufactured on at least one of a flexible and rigid substrate and a product.

7. A tag detection system comprising:
   a source for producing an interrogation signal having a first frequency;
   a harmonic radar tag comprising:
      an antenna structure;
      a tunneling junction electrically and integrally coupled to the antenna structure; and
   wherein the harmonic radar tag when stimulated by the interrogation signal having the first frequency, and the harmonic radar tag produces a response signal at a second frequency different from the first frequency.

8. The tag detection system of claim 7, wherein the response signal at the second frequency is the tag's harmonic signature.

9. The tag detection system of claim 8, wherein the tunneling junction is caused to respond to a specific stimulus by changing the tunneling junction's current-voltage characteristic, thereby leading to changes in the harmonic signature.

10. The tag detection system of claim 9, wherein the tunneling junction comprises at least one insulation layer separating a first conductive metal layer and a conductive metal layer.

11. The tag detection system of claim 10, wherein the tunneling junction is deformable under stress, resulting in changes in tunneling distance and related current-voltage (I-V) characteristics, and consequently changes in the harmonic signature.

12. The tag detection system of claim 10, wherein the tunneling junction is responsive to an environmental stimulus.

13. The tag detection system of claim 12, wherein the environmental stimulus is at least one of temperature, strain, pressure, light, acceleration, ionizing radiation, and a magnetic field.

* * * * *